US012021328B2

(12) United States Patent
Baldus-Kunze

(10) Patent No.: US 12,021,328 B2
(45) Date of Patent: Jun. 25, 2024

(54) INTERFACE FOR F-MALE CONNECTOR

(71) Applicant: PPC BROADBAND, INC., East Syracuse, NY (US)

(72) Inventor: Søren Baldus-Kunze, Slagelse (DK)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/867,575

(22) Filed: Jul. 18, 2022

(65) Prior Publication Data

US 2022/0376434 A1 Nov. 24, 2022

Related U.S. Application Data

(63) Continuation of application No. 17/102,428, filed on Nov. 23, 2020, now Pat. No. 11,394,155.

(60) Provisional application No. 62/940,056, filed on Nov. 25, 2019.

(51) Int. Cl.
*H01R 13/622* (2006.01)
*H01R 13/631* (2006.01)
*H01R 13/52* (2006.01)

(52) U.S. Cl.
CPC ......... *H01R 13/622* (2013.01); *H01R 13/631* (2013.01); *H01R 13/5219* (2013.01)

(58) Field of Classification Search
CPC ................ H01R 13/622; H01R 13/631; H01R 13/5219; H01R 13/025; H01R 13/629; H01R 2103/00; H01R 2201/18; H01R 24/40
See application file for complete search history.

(56) References Cited

U.S. PATENT DOCUMENTS

| | | | | |
|---|---|---|---|---|
| 7,753,705 | B2 | 7/2010 | Montena | |
| 9,859,631 | B2 * | 1/2018 | Burris | H01R 13/622 |
| 10,418,729 | B2 * | 9/2019 | Burris | H01R 9/0524 |
| 10,644,417 | B2 * | 5/2020 | Balcer | H01R 13/502 |
| 2011/0143586 | A1 * | 6/2011 | Ehret | H01R 43/26 439/584 |
| 2017/0069982 | A1 * | 3/2017 | Burris | H01R 43/16 |
| 2017/0104280 | A1 * | 4/2017 | Edmonds | H01R 24/38 |
| 2017/0149152 | A1 * | 5/2017 | Watkins | H01R 24/38 |
| 2018/0131139 | A1 * | 5/2018 | Matzen | H01R 24/56 |
| 2018/0138603 | A1 * | 5/2018 | Balcer | H01R 13/025 |

(Continued)

OTHER PUBLICATIONS

Extended European Search Reported dated Mar. 24, 2021 in corresponding European Patent Application No. 20209456.1, 8 pages.

*Primary Examiner* — Abdullah A Riyami
*Assistant Examiner* — Nader J Alhawamdeh
(74) *Attorney, Agent, or Firm* — MH2 TECHNOLOGY LAW GROUP LLP

(57) ABSTRACT

An F-male port includes a nut with internal threads that are configured to provide a mechanical fit and lock of the F-male port with an F-female port. The F-male port further includes a mating interface having an insert with an angled surface, wherein the mating interface is adaptable to differentials in surfaces of mated F-female ports. The F-male port also includes a nut retainer configured to hold the nut in place, wherein when the nut is torqued down, force is applied to the nut retainer and the nut retainer pulls the front of the insert with it to create a mechanical contact between the F-female port and the insert.

30 Claims, 4 Drawing Sheets

(56) References Cited

U.S. PATENT DOCUMENTS

| | | | | |
|---|---|---|---|---|
| 2018/0358719 | A1* | 12/2018 | Burris .................... | H01R 24/40 |
| 2021/0159635 | A1* | 5/2021 | Baldus-Kunze ..... | H01R 13/629 |

* cited by examiner

INTERFACE FOR F-MALE CONNECTOR

CROSS-REFERENCE TO RELATED APPLICATIONS

This application is a continuation of U.S. Nonprovisional application Ser. No. 17/102,428 filed on Nov. 23, 2020, pending, which claims the benefit of priority under 35 U.S.C. § 119 of U.S. Provisional Application No. 62/940,056, filed Nov. 25, 2019, the contents of which are relied upon and incorporated herein by reference in their entireties.

BACKGROUND

The present disclosure generally relates to interfaces for F-male connectors, and particularly interfaces for F-male connectors, having one or more angled surfaces.

Although F-type ports have accepted standards used by manufacturers, these standards allow the size of mating surfaces and the quality of materials and machining to differ significantly, resulting in poor mating with F-type ports. For example, the seating on an interface in the F-type port may be off-centered due to standard tolerances and/or manufacturing standards, possibly resulting in a tilted interface from an off-centered installation.

A tilted interface may also result from height differentials after machining or casting. If the installation is tilted, the torque in the nut (which will be off-centered) will be uneven, and as such, vibration or a light touch could place the connector in a different position, thus losing the torque on the nut. As a result, due to the tilting, the nut of the connector may break loose after some time.

Matching may also be difficult due to poor machining/casting, resulting in a poor electrical connection. A poor electrical connection may in turn cause high resistance (signal loss) or ingress (noise from surroundings). The effects of matching under these circumstances may thus result in increased replacement costs for the end user.

Some vendors have created "seals/seal rings" for the front of male ports. However, these are meant to address the issue of ingress and continuity and do not address issues associated with providing contact between the surfaces for improved mating. An existing sealing ring is designed to be compressed when a nut of the F-type port is torque, leaving a flat surface that does not compensate for interface differentials in F-female ports.

The invention, as claimed and disclosed herein, overcomes the address some of these issues and provides other related advantages.

SUMMARY

Embodiments are directed to a front end of an F-male port having a mating interface with an angled surface. The mating interface may be either in a concave or convex design and is configured to compensate for interface differentials in F-female ports.

Some embodiments are directed to an F-male port comprising a nut with internal threads that are configured to provide a mechanical fit and lock of the F-male port with an F-female port. The F-male port further includes a mating interface having an insert with an angled surface, wherein the mating interface is configured to adapt to differentials in surfaces of mated F-female ports. The F-male port also includes a nut retainer configured to hold the nut in place, wherein when the nut is torqued down, force is applied to the nut retainer and the nut retainer pulls the front of the insert with it to create a mechanical contact between the F-female port and the insert.

In some embodiments a connector comprises an F-female port comprising a mating surface and an F-male port. The F-male port includes a nut with internal threads that are configured to provide a mechanical fit and lock of the F-male port with the F-female port. The F-male port further includes a mating interface having an insert with an angled surface, wherein the mating interface is configured to adapt to differentials in surfaces of mated F-female ports. The F-male port also includes a nut retainer configured to hold the nut in place, wherein when the nut is torqued down, force is applied to the nut retainer and the nut retainer pulls the front of the insert with it to create a mechanical contact between the F-female port and the insert.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
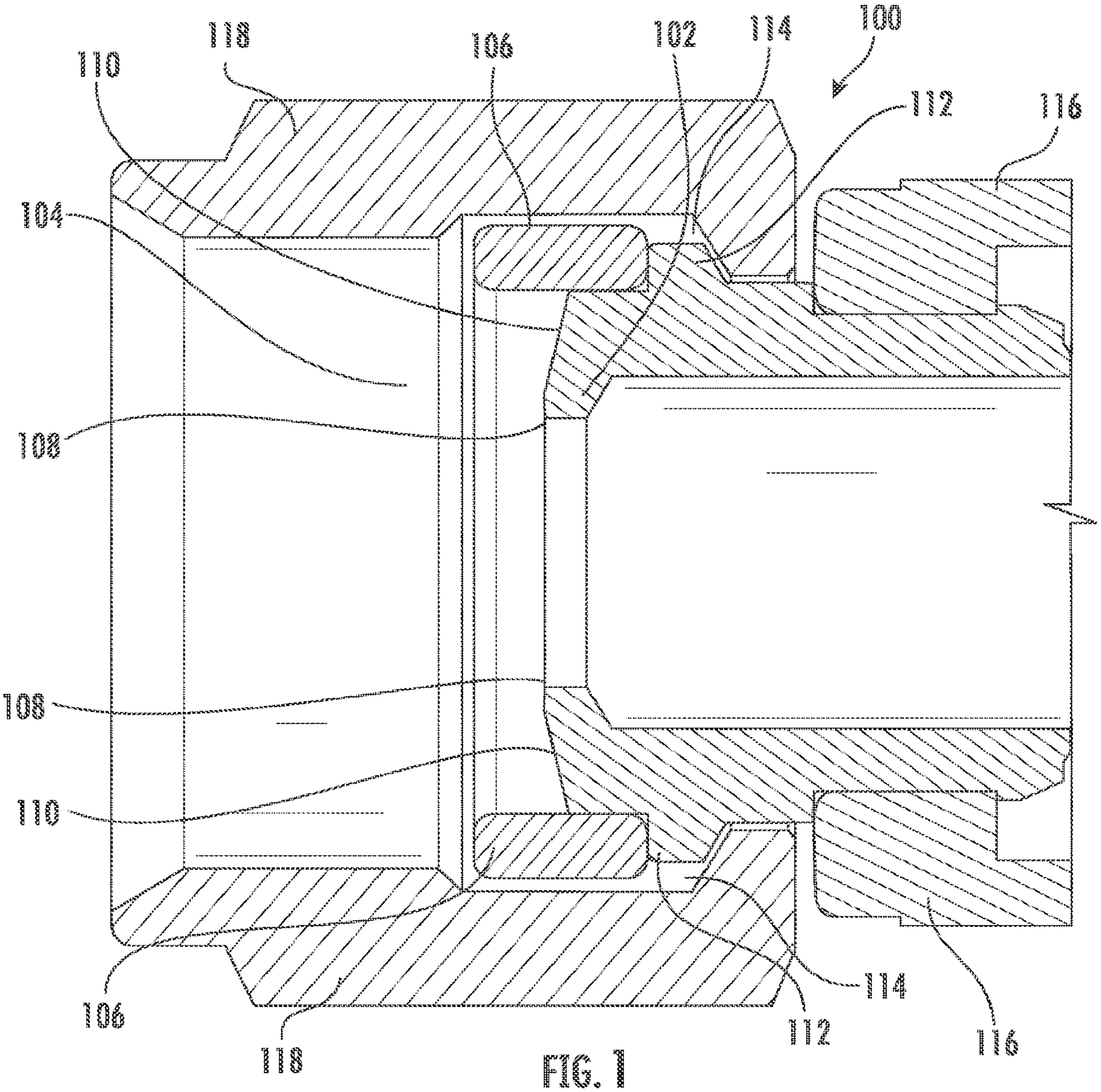
FIG. 1 is a cross-sectional view of a front end of a mating surface for an F-male connector in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to a frontend of an F-male port having a mating interface with an angled surface. The mating interface may include either a concave portion or convex portion such that the interface compensates for interface differentials in F-female ports.

Interface differentials in the F-female ports may result from different designs, dimensions, materials, and other factors. For example, F-female port interfaces may have different contact surfaces, surface conditions, angles of the rim, centering of the bore, and material height, all of which may result from different designs or manufacturing factors.

Existing designs of current F-ports, having flat mating/contact surfaces for the male part, do not compensate for these interface differentials in the F-female ports.

FIG. 1 shows a sectional front view of a mating surface for an F-male port in accordance with some embodiments. F-male port 100 includes an F-nut 104 with internal threads that can be screwed onto an F female port. F-nut 104 is thus configured to provide a mechanical fit and lock of the F-male port with the F-female port. F-male port 100 may also include a flexible circumferential O-ring 106 for sealing and moisture-proofing of the F-male connector. A dielectricum retainer 108 is configured as the inner lip of a convex part of a mating interface 102 having an angled surface, having an angle .quadrature. ranges from about 0.5 degrees to about 45 degrees when measured with respect to a front edge 105 and a front face 107 of the mating interface. Dielectricum retainer 108 also prevents a cable threaded through the F-male port from being pushed too far through an insertion of the F-male port, wherein when the cable being threaded through the F-male port hits dielectricum retainer 108, dielectricum retainer 108 stops the cable and prevents the cable from protruding too far through nut 104.

In some embodiments, mating interface 102 is configured to include a mandrill/insert/sleeve conical front 110. The mandrill/insert/sleeve conical front 110 of mating interface 102 may be configured in some embodiments from 0.5 degrees to 45 degrees, and as such, the convex mating interface 102 is configured to adapt to differentials in surfaces of mated F-female ports. A nut retainer 112 inserted into recess 114 below O-ring 106 is configured to hold nut 104 in place. When nut 104 is torqued down, force is applied to nut retainer 112 and nut retainer 112 pulls the front of insert 110 with it to create a mechanical contact between the F-female port and insert 110 of the connector. The surface 118 of nut 104 is shown to extend below nut retainer 112. A Polyoxymethylene (POM) body/member 116 serves as the compression part of the connector.

Due to its shape, mating interface 102 is self-centering with respect to a center axis of the F-female port. Preferably, the self-centering is achieved with a tolerance ranging from about .+-.0.005, preferably about .+-.0.002, and more preferably about .+-.0.001. As a result, when mated with a tilted interface on a mated F-female port due to off-centered installation, as mating interface 102 self-centers, it is configured to align nut 104 to be torqued in a centered position. The self-centering of mating interfaces also causes mating interface 102 to adapt to the front of a connector face (not shown) if there is a height differential. When there is a height differential, mating interface 102 is configured to adapt to the front of the connector face by self-aligning and evening out the height differential because there will be a higher top on one side and material displacement until mating interface 102 meets the other side, resulting in a perfect fit.

The self-centering of mating interfaces also causes mating interface 102 to adapt to the opening of a mated F-female port (not shown). If, for example, the F-female port (not shown) that is mated with mating interface 102 has a wide opening, mating interface 102 is configured to contact on the other parts and self-center or if the F-female port has a narrow opening, mating interface 102 is configured to self-center and align with the F-female port. As mating interface 102 always adapts to the mating part, the contact points will be optimum for the parts, leaving as low as possible resistance and no possibility for ingress caused by bad matching that results from poor machining or casting.

Mating interface 102 is also configured to work with new and existing cable designs, making it possible for an end user to re-terminate existing cables to achieve higher performance. Although the frontend of the mating surface for the F-male port includes mating interface 102, there is still enough room for sealing O-ring 106. In cases where the end user does not want to use sealing O-ring 106, the contact point/mating with mating interface 102 makes an almost watertight fit (although in cases where the machining is really bad it might not seal completely). As mating interface 102 is implemented in the frontend, the mating surface for an F-male port including mating interface 102 can be implemented in any connector type and still comply with the standards for the F-port.

Figure 2:
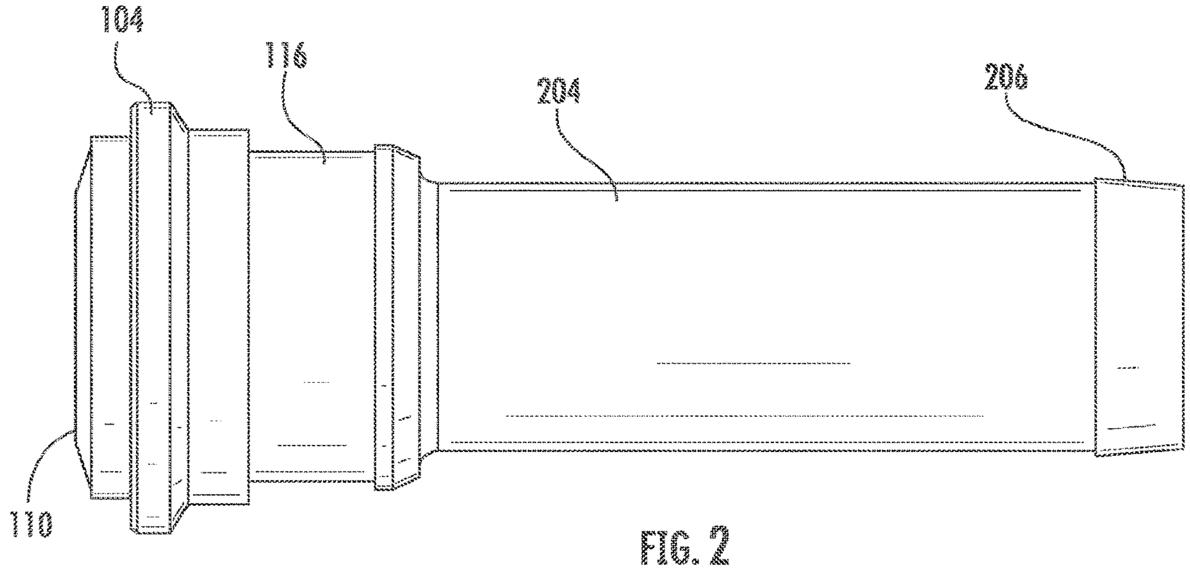
FIG. 2 is a side view of an insert of a connector in accordance with some embodiments.

FIG. 2 shows an overall side view of an insert of a connector of FIG. 1 in accordance with some embodiments. The insert of FIG. 2 show includes the front end of the mating surface for the F-male port 100. The conical front 110 starts from the outer part of the mandrill and goes to the inner lip of the insert that is given by the impedance of the cable. FIG. 2 shows the interfacing of conical front 110, shoulder for nut 104, shoulder for POM body 116, the entire insert/sleeve 204 for dielectricum insertion, and the heel for cable retention 206.

Figure 3:
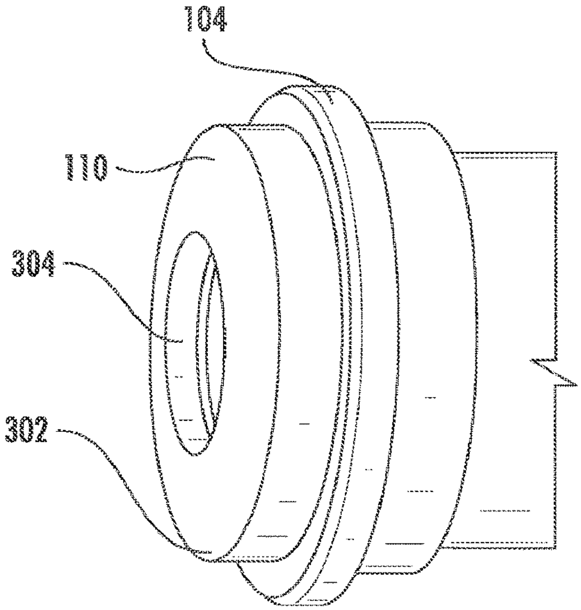
FIG. 3 is another side view of the insert of FIG. 2 in accordance with some embodiments.

FIG. 3 shows another side view of the insert of FIG. 2 in accordance with some embodiments. FIG. 3 shows the convex contour of the insert. The conical front 110 starts from the outer lip 302 of the mandril and goes to the inner lip 304 of the insert that is given by the impedance of the cable.

In some embodiments, when nut 104 is torqued, the angled part of the mandrill meets the front of the female port (not shown). The front of the mandrill inner lip meets the inner diameter of the female port opening. On a microscopic level, the surface may be very rough and the highpoints may be smoothed out by the angled front of the mandrill. During the torque of the nut, the entire circumference of the mandrill is embedded into the material, leaving a 360 degree contract. The footprint may vary depending on the material softness and the amount of opening in the female port. The indentation does not scar the surface and leaves the surface treatment intact.

Figure 4:
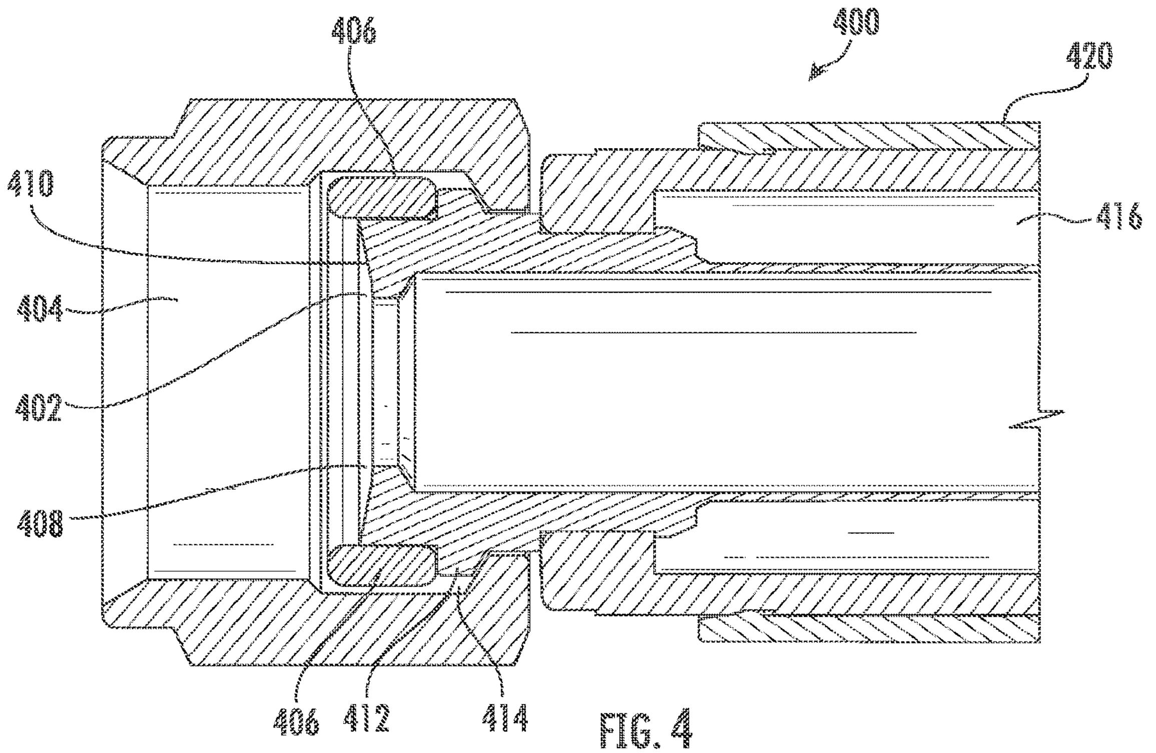
FIG. 4 is a cross-sectional view of a front end of another mating surface for an F-male port in accordance with some embodiments.

FIG. 4 shows a sectional view of a front end of another mating surface for an F-male port in accordance with some embodiments. F-male port 400 includes an F-nut 404 with internal threads that can be screwed onto an F female port to provide a mechanical fit and lock of the F connector. F-male port 400 may also include a flexible circumferential O-ring 406 for sealing and moisture-proofing of the F-male connector. A dielectricum retainer 408 serves as the inner lip of a concave part of a mating interface 402. For example, mating interface 402 is configured to include a concave design, wherein mating interface 402 is configured to adapt to differentials in the surfaces of mated F-female ports. The conical front 410 of the mandrill/insert/sleeve of the concave part of mating interface 402 may be configured in some embodiments to have an angle, ranging from 0.5 degrees to 45 degrees when measured with respect to an outer edge 411 of the front 410 to a front face 413 of the interface 402.

Dielectricum retainer 408 is also configured to prevent a cable threaded through the F-male port from protruding too far through nut 404. A nut retainer 412 inserted into recess 414 below O-ring 406 is configured to hold nut 404 in place. When nut 404 is torqued down, force is applied to nut retainer 412 and nut retainer 412 pulls the front of insert 410 with it to create a mechanical contact between the F-female port and insert 410 of the connector. A POM body/member 416 serves as the compression part of the connector. A compression body 420 is fitted over the POM member 416.

Similar to mating interface 102, due to its shape, mating interface 402 is also self-centering with respect to a center axis of the F-female port. As a result, when mated with a tilted interface, mating interface 402 self-centers and aligns nut 404 to be torqued in a centered position. The self-centering also causes mating interface 402 to adapt to the front of a connector face (not shown) if there is a height differential.

If an F-female port (not shown) that is mated with mating interface 402 has a wide opening, mating interface 402 is configured to contact on the other parts and self-center or if the F-female port has a narrow opening, mating interface 402 is configured to self-center and align with the F-female port. Mating interface 402 adaptation to mated surfaces causes contact points to be optimum, leaving as low as possible resistance and no possibility for ingress caused by bad matching that results from poor machining or casting.

Mating interface 402 is also configured to work with new and existing cable designs. The F-male port including mating interface 402 also includes room for sealing O-ring 406. In cases where the end user does not want to use sealing O-ring 406, the contact point/mating with mating interface 402 makes an almost watertight fit (although in cases where the machining is really bad it might not seal completely). The mating surface for an F-male port including mating interface 402 can be implemented in any connector type and still comply with the standards for the F-port.

Figure 5:
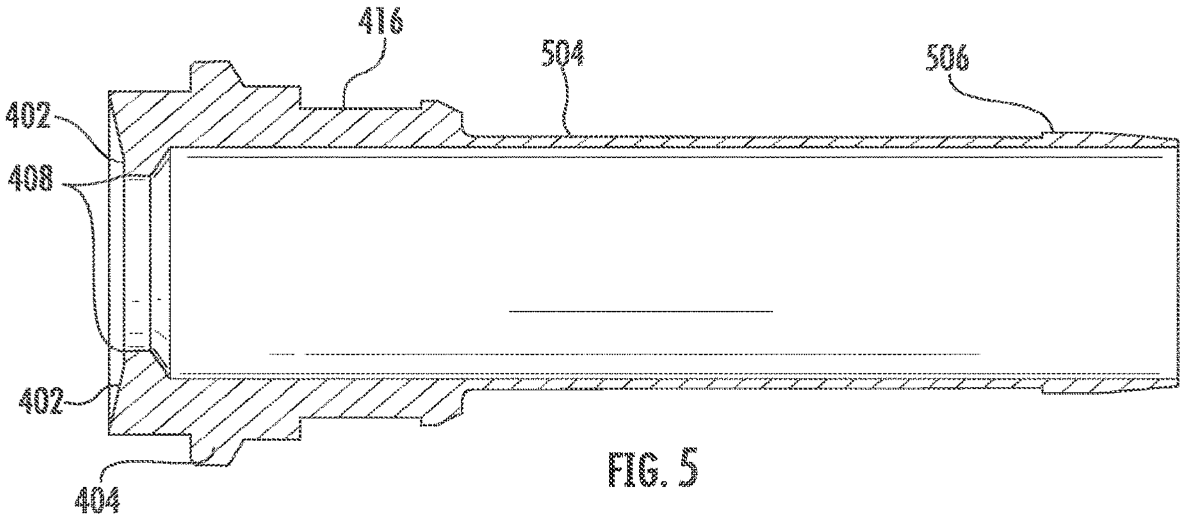
FIG. 5 is a side view of an insert of the connector of FIG. 4 in accordance with some embodiments.

FIG. 5 shows an overall side view of an insert of a connector of FIG. 4 in accordance with some embodiments. The concave front 410 starts from the inner part of the insert that is given by the impedance of the cable and goes to the outer lip of the mandrill. FIG. 2 shows the interfacing of concave front 410, shoulder for nut 404, dielectricum retainer 408, shoulder for POM body 416, the entire insert/sleeve 504 for dielectricum insertion, and the heel for cable retention 506.

Figure 6:
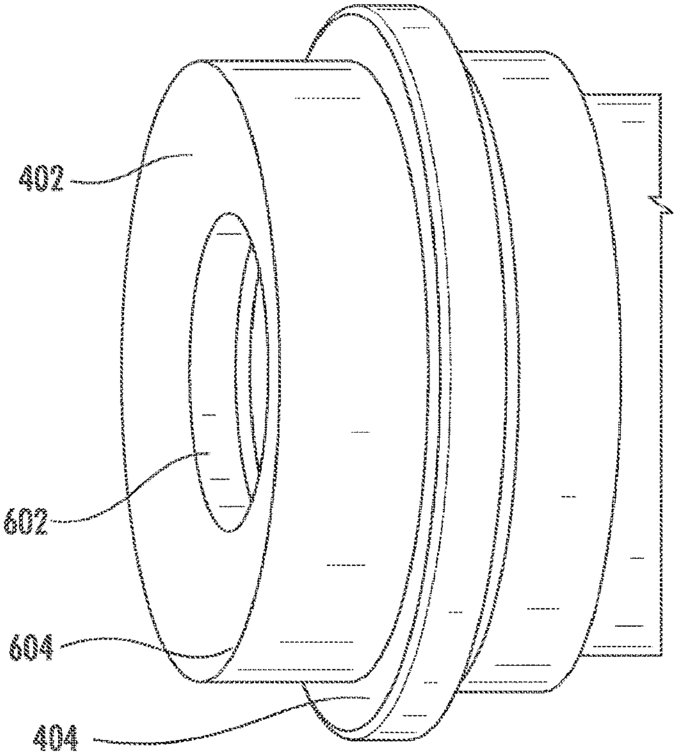
FIG. 6 is another side view of the insert of FIG. 4 in accordance with some embodiments.

FIG. 6 shows another side view of the insert of FIG. 4 in accordance with some embodiments. FIG. 6 shows the concave contour of the insert. The conical front 110 starts from the inner lip 602 of the insert that is given by the impedance of the cable and goes to the outer lip 604 of the mandril.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within about 10%, in another embodiment within 5%, in another embodiment within 1% and in another embodiment within about 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A connector configured to adapt to differently shaped surfaces of mated female ports so as to improve an electrical connection between a male port and differently shaped female ports comprising:

a female port configured to include a mating surface;

a male port configured to include a nut configured to mechanically fit to the female port, a mating interface portion configured to include an angled surface portion, configured to contact and adapt to different shapes of mated female ports, and a nut retainer configured to move the mating interface portion with the nut;

wherein the different shapes of mated female ports comprise a first female port having a first mating portion shape and a second female port have a second mating portion shape that is different from the first mating portion shape;

wherein the first mating portion shape is a first angled shape and the second mating portion shape is a second angled shape that is different from the first angled shape;

wherein the nut is configured to apply a force to the nut retainer when the nut is tightened onto the female port and the nut retainer is configured to move the mating interface portion with the nut so as to create a mechanical contact between the angled surface portion of the mating interface portion of the male port and the female port; and wherein the angled surface portion of the mating interface portion is configured to adapt to differently shaped surfaces of mated female ports so as to improve an electrical connection between the male port and differently shaped female ports.

2. The connector of claim 1, wherein the mating interface of the male port comprises a conical shaped interface portion.

3. The connector of claim 1, wherein the mating interface of the male port comprises a concave shape portion.

4. The connector of claim 1, wherein the angled surface portion ranges from about 0.5 degrees to about 45 degrees.

5. The connector of claim 1, wherein the mating interface of the male port is configured to be self-centering relative to a center axis of the female port so as to align the nut toward a center position during assembly when the mating interface mates with a tilted surface of the female port.

6. A male port for providing an improved electrical connection with a plurality of different female ports each have differently mating portions comprising:

a nut configured to fit a male port to a female port;

a mating interface having an angled surface that is configured to adapt to differently shaped mating portions of the female port;

a nut retainer configured to move the mating interface with the nut;

wherein the nut is configured to apply a force to the nut retainer when the nut is tightened onto the female port such that the nut retainer moves the mating interface with the nut so as to create a mechanical contact between the angled surface and the differently shaped mating portions of the female port; and wherein the angled surface of the mating interface of the male port is configured to create an electrical connection between the male port and the differently shaped mating portions of the female port.

7. The male port of claim 6, wherein at least a portion of the mating interface is conical.

8. The male port of claim 6, wherein at least a portion of the mating interface is concave.

9. The male port of claim 6, wherein the angled surface has an angle that ranges from about 0.5 degrees to about 45 degrees.

10. The male port of claim 6, wherein the angled surface of the mating interface includes an inner lip that is configured to form a dielectricum retainer that is configured to prevent a cable threaded through the male port from protruding into the nut.

11. The male port of claim 6, wherein the mating interface is configured to be self-centering relative to a center axis of the female port during assembly, and wherein the mating interface is configured to mate with a tilted interface of the female port to align the nut in a centered position as the mating interface self-centers.

12. The male port of claim 6, wherein the mating interface is configured to be self-centering relative to a center axis of the female port, and wherein the mating interface is configured to adapt to differently shaped mating opening portions of mated female ports.

13. The male port of claim 6, wherein the male port is an F-male port and the female port is an F-female port.

14. The male port of claim 6, wherein the differently shaped mating portions of the female port comprises a first female port having a first mating portion shape and a second female port have a second mating portion shape that is different from the first mating portion shape; and wherein the first mating portion shape is a first angled shape and the second mating portion shape is a second angled shape that is different from the first angled shape.

15. A connector for providing an improved connection between a male port and different female port shapes comprising:

a nut configured to engage a female port;

a mating interface having an angled interface portion that is configured to adapt to either a first female port having a first mating portion shape or a second female port have a second mating portion shape that is is different from the first mating portion shape;

a nut retainer configured to move the mating interface with the nut and apply a force to the nut retainer when the nut is tightened to the female port such that the angled interface portion of the mating interface mechanically contacts a contact portion of either the first female port or the second female port; and wherein the mating interface is configured to self-center the nut relative to either the first female port or the second female port during assembly and adapt to the first mating portion shape of the first female port or the second mating portion shape of the second female port so as to provide an improved electrical connection between the male port and either the first female port or the second female port.

16. The connector of claim 15, wherein at least a portion of the angled interface surface of the mating interface is conical.

17. The connector of claim 15, wherein at least a portion of the angled interface surface of the mating interface is concave.

18. The connector of claim 15, wherein the angled interface surface of the mating interface has an angle ranging from about 0.5 degrees to 45 degrees.

19. The connector of claim 15, wherein the mating interface is configured to be self-centering with respect to a center axis of the female port, and wherein when the mating interface mates with a tilted surface of the female port, the mating interface aligns the nut in a centered position as the mating interface self-centers.

20. The connector of claim 15, wherein the mating interface is configured to be self-centering with respect to a center axis of either the first female port or the second female port, and wherein the mating interface is configured to adapt to the first mating portion shape of the first female port and the second mating portion shape of the second female port when the first mating portion shape of the first female port is a different shape than the second mating portion shape of the second female port.

21. The connector of claim 15, wherein the mating interface is configured to be self-centering with respect to a center axis of either the first female port or the second female port, and wherein the mating interface is configured to adapt to an opening of the female port.

22. The connector of claim 15, wherein the male port is an F-male port and the female port is an F-female port.

23. The connector of claim 15, wherein the first mating portion shape is a first angled shape and the second mating portion shape is a second angled shape that is different from the first angled shape.

24. A connector for providing an improved connection between a male port and a plurality of differently shaped female ports comprising:

a male port having a nut that is configured to mechanically fit to the female port, a mating interface portion having an angled surface portion that is configured to contact and adapt to either a first mating surface portion of a first female port or a second mating surface portion of a second female port;

a nut retainer configured to move the mating interface portion with the nut;

wherein the nut is configured to apply a force to the nut retainer when the nut is tightened onto the female port such that the nut retainer moves the mating interface portion with the nut to create a mechanical contact between the angled surface portion and either the first female port or the second female port so as to create an improved connection between the male port and either the first mating surface portion of the first female port or the second mating surface portion of the second female port; and wherein the first mating surface portion of the first female port has a different shape than the second mating surface portion of the second female port.

25. The connector of claim 24, wherein the mating interface portion of the male port comprises a conical shaped interface portion.

26. The connector of claim 24, wherein the mating interface portion of the male port comprises a concave shaped interface portion.

27. The connector of claim 24, wherein the angled surface portion comprises an angle ranging from about 0.5 degrees to about 45 degrees.

28. The connector of claim 24, wherein the mating interface portion of the male port is configured to self-center with respect to a center axis of the female port such that the matting interface portion aligns with the nut in a centered position during assembly when the mating interface portion mates with a tilted surface of the female port.

29. The connector of claim 24, wherein the male port is an F-male port and the female port is an F-female port.

30. The connector of claim 24, wherein the first mating surface portion is a first angled shape and the second mating surface portion is a second angled shape that is different from the first angled shape.

* * * * *